6338X
E. M. WAGGONER.
Plow.
Patented Jan. 12, 1831.
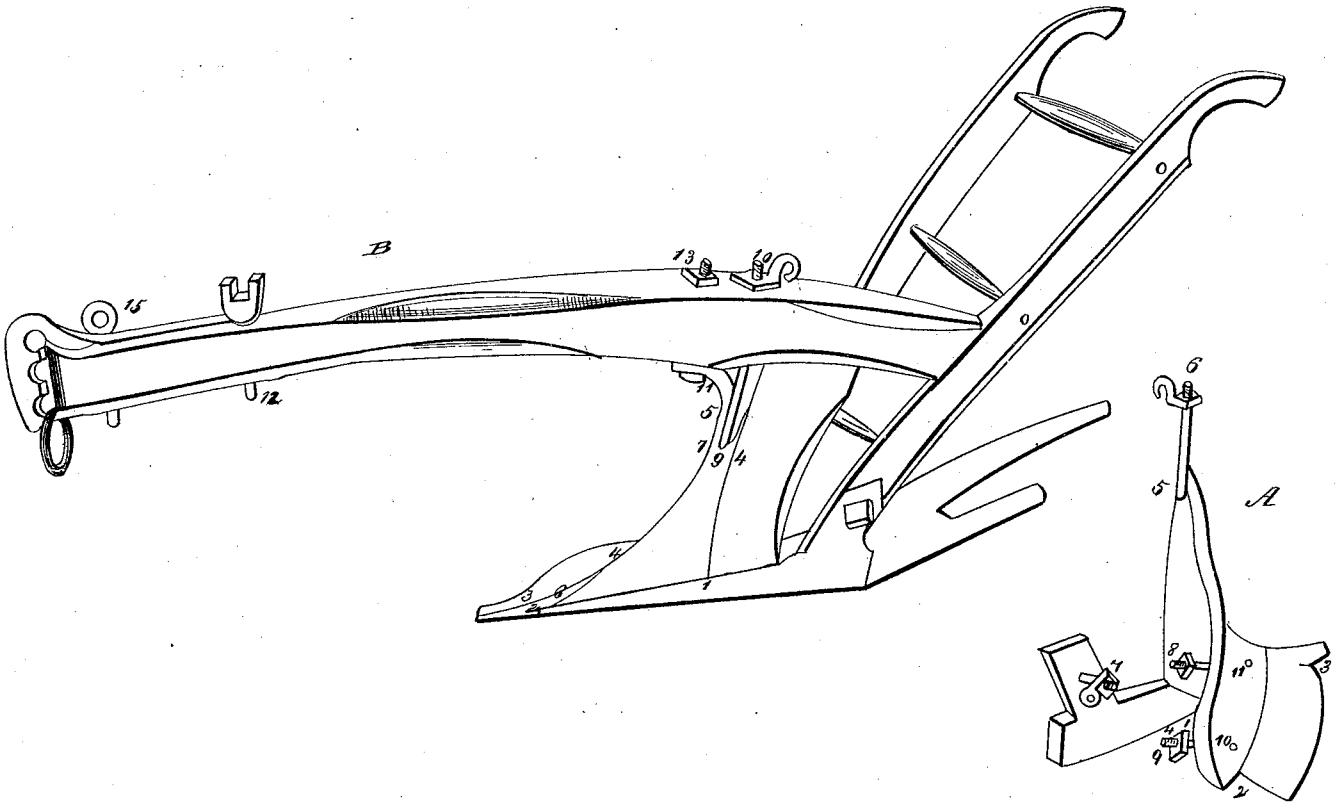
N. PETERS, PHOTO-LITHOGRAPHER, WASHINGTON, D. C.

6338X

UNITED STATES PATENT OFFICE.

EDMUND M. WAGGENER, OF ADAIR COUNTY, KENTUCKY.

BAR-SHARE PLOW.

Specification forming part of Letters Patent dated January 12, 1831.

*To all whom it may concern:*

Be it known that I, EDMUND M. WAGGENER, of Adair county, Kentucky, have invented an Improvement in Bar Share Plows, of which the following is a specification.

All parts pressed by or coming in contact with the earth are of metallic substance—the bar-share and point of wrought iron and steel, the mold or rolling board of cast-iron. The bar and share are welded together, forming one piece. (See Plate A.) The bar is sloped projectively from its center to the front point. (See Plate B, Figures 1 and 2.) The share is of a solid triangular shape, forming a level base on top to the width of the rolling-board P A F 1 2 3, thence sloped down at near right angles, so as to form a smooth and regular circle with the face of the rolling-board from one point to the other, and upon the entire face of the plow P B F 3 4 5, the front edge of the rolling-board serving as a colter, being cast solid in front, with a sharp edge extending up near the under part of the beam, forming a quarter-circle, P B F 6 7, having two wrought screws cast in said board, the one in its heel, the other in the rear side of the solid part P A F 4 10, through which part is also cast a tube-hole, terminating two-thirds width in the rear of said board P A F 5 and B F 14.

The stock (consisting of a wooden beam, a sheth, helve, two handles, and three rounds) is united to the rolling-board permanently, with the wrought screw in its rear, which passes through the sheth or helve and screwed firm; P B F 8, an iron rod passing through (from the under part of the share) the tube-hole in the rolling-board, through the beam, and screwed by a tap on top; P A F 6 and P B F 9 10, an iron bolt passing through the face of the board and sheath and riveted. The handles are put on with iron pins, screws, and taps; P A F 7 8 9, a lock rod or brace extending through the sheth to the under part of the beam, along the same near the end, where it is attached to the clevis by a screw-driver, which passes through the beam and clevis; P B F 11 12, an iron bolt passing through said rod or brace, the beam, and screwed at top P B F 13. The stock and rolling-board thus united is designed not to be separated, and when placed upon the bar and share the whole is permanently bound together by the screw in the heel of the board, a screw-pin in the front point thereof, P A F 10 11, both of which pass through the level base of the share and screwed by taps underneath, as also by the iron rod which passes through the share, the tube-hole in the board, and through the beam, with a screw and tap on the top; P B F 9 10, the clevis designed to give or take the land and to regulate the depth of the plow P B F 15.

The plow is adapted to work with or without a colter, and designed for fallowing, ridging, and ditching farm-lands, draining marshes, turnpiking roads, and repairing highways.

The projective slope of the bar and share gives to the plow a descending draft, which causes it to draw to and retain its hold in the earth to the depth regulated or required. The rolling-board and face of the share, forming a regular circle and passing on at near right angles, roll, bed, and pulverize the earth at one and the same time, placing the surface soil to the depth the plow runs and bringing the clay or subsoil upon the surface.

All parts of the plow which are pressed by the earth, being metallic, immediately scour smooth, cut, slide, and roll off the earth without friction or compression, which renders the draft extremely light, and from the combination of its parts is rendered the more permanent by a hard draft.

EDMUND M. WAGGENER.

Witnesses:

GEO. WAGLY,

DANIEL SUDDANT.